Oct. 11, 1955  K. E. SNYDER  2,720,190
SERVO MECHANISMS AND ASSOCIATED VALVING
Filed Dec. 4, 1952
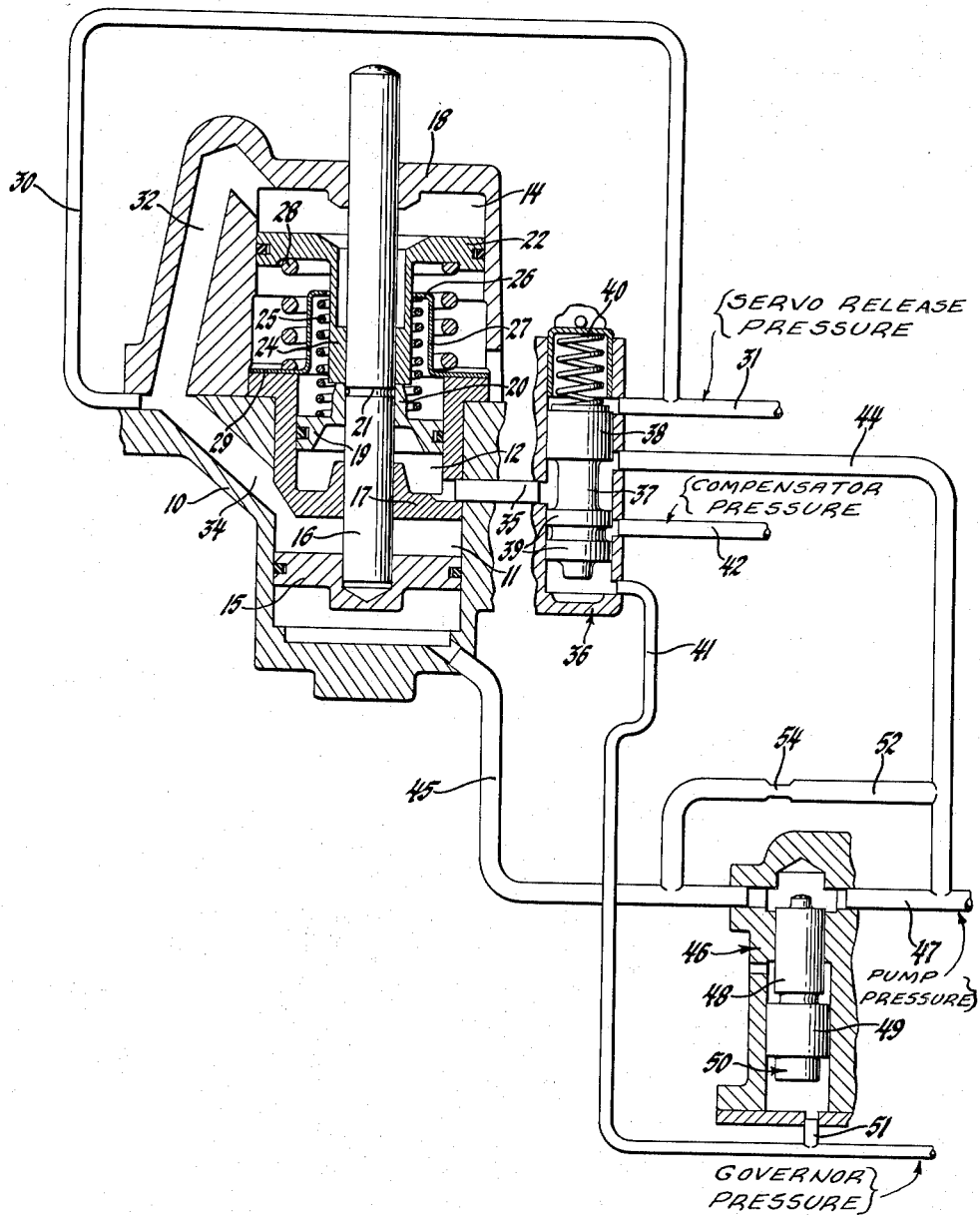
INVENTOR
Kenneth E. Snyder
BY
Willits, Helmig & Baillio
ATTORNEYS

United States Patent Office 2,720,190
Patented Oct. 11, 1955

2,720,190

SERVO MECHANISMS AND ASSOCIATED VALVING

Kenneth E. Snyder, Northville, Mich., assignor to General Motors Corporation, Detroit, Mich., a corporation of Delaware Application December 4, 1952, Serial No. 323,964

7 Claims. (Cl. 121—38)

This invention relates to servo mechanisms and associated valving particularly adapted for use in hydraulically operated automatic transmissions.

The present invention constitutes an improvement over similar mechanism and valving shown and described in the co-pending applications of Walter B. Herndon, S. N. 235,213, filed July 5, 1951, for Transmission Control System and S. N. 295,519, filed June 25, 1952, for Transmission Control System, and the principal object of the invention is to improve the operating characteristics of devices of this type. As described in these applications, the transmissions thereof can be operated in a number of ranges and, consequently, the selector mechanism can be operated to select any one of a number of conditions. These conditions are: Neutral; Driving Range 4, which indicates that the mechanism can be operated in four forward speeds; Driving Range 3, which indicates that the mechanism can be operated normally only in the first three speeds; Low, which indicates that the mechanism can be operated only in first and second speeds; and Reverse.

In transmissions of the type shown and described in the above mentioned applications, use has been made of two forward drive planetary gear units and a reverse planetary gear unit, the forward drive units having a fluid coupling interposed therebetween. Each of the forward drive units has one element thereof provided with a drum about which a brake band can be so applied as to restrain the drum and the element from rotation. Each unit also includes a clutch for locking two of the elements of the units together for certain speed ratios.

In order that the brake band can be applied to the drum in such fashion as to lock the same against rotation under all operating conditions requiring such a state, use is made of a servo device to which liquid can be supplied for developing the force necessary for the application of the band. The mechanism with which this invention is concerned is constructed particularly for use in connection with the application and release of the brake band incorporated in the first or front drive unit of the transmission disclosed in the said applications. In this transmission the front unit is operated in reduction drive for first and third forward speeds and for reverse, and in direct drive for second and fourth forward speeds. In order that the unit may operate in reduction drive, it is necessary that the band be applied to lock one of the elements of the unit against rotation, and it is evident that the force required for such locking action may vary as the power being transmitted through the transmission varies. Consequently, the present invention makes provision for so supplying liquid under pressure as to provide the necessary force for holding the band in locking condition with the drum during the variable operating conditions thereof and under the various power transmission conditions prevailing in these operations.

The features, objects and advantages of the invention will become apparent by referring to the following drawing illustrating the same in diagrammatic fashion.

Referring to the drawing, 10 indicates a servo housing made up of a number of parts so shaped and joined together as to form three chambers, 11, 12 and 14. Slidably mounted in chamber 11 is a piston 15 having secured thereto a piston rod 16 which passes through a partition wall 17 and through the end wall 18 of the housing to extend a suitable distance therebeyond. Slidable within the chamber 12 is a piston 19, the hub 20 of which has a part forced into an annular groove 21 in the piston rod so that the piston 19 must reciprocate with the rod. Slidably mounted within chamber 14 is a piston 22, the hub 24 of which is secured to the rod 16 in any suitable fashion. A spring 25 surrounds the hubs 20 and 24 and is confined between the upper wall of piston 19 and a step 26 on the member 27. A second spring 28 surrounds the tubular part of member 27 and is secured to the lower step 29 thereof and to the underside of the piston 22.

The casing 10 is provided with a port connected to the oil line 30 which is a branch of supply line 31. The port just mentioned is in communication with a channel 32 extending to the chamber 14 above piston 22 and a channel 34 extending to chamber 11 above piston 15.

Chamber 12 is provided with a port connected to line 35, which in turn is connected to a port in the body of valve 36 to communicate with the bore thereof. This bore has slidably mounted therein a valve member 37 having a land 38 and spaced lands 39. A spring 40, retained in the upper part of the valve bore, normally forces the valve 37 downwardly to the full extent of its permissible travel. The body of valve 36 has a port therein near the bottom thereof connected to line 41 which acts as a supply line. A spaced port in the valve body is connected to supply line 42; a third port is connected to branch line 44; and a fourth port is connected to the supply line 31.

The casing 10 is provided with a port near the bottom thereof and in communication with chamber 11 below piston 15, which port is connected to a line 45 in turn connected to a port in the body of a valve 46. The same port in this valve body has connected thereto a supply line 47. The bore in the body 46 is formed in two diameters within which fit parts 48 and 49 of the valve member indicated generally at 50. A port in the bottom of valve body 46 has connected thereto a branch line 51 from the supply line 41. A bypass line 52, having a restriction 54 therein, extends from line 44 to line 45.

The servo incorporated in casing 10 is of the liquid-apply spring-release type well known in this art. However, in order that the size of the device may be kept within reasonable limits, it becomes necessary to assist the liquid pressure which is ample for low load operation by the introduction of additional liquid pressure during phases of operation requiring more force, due to higher power transmission. It will be understood, of course, that the piston rod 16 cooperates with the band (not shown) in such manner that movement of the piston rod outwardly, relative to the casing, causes the band to be wrapped around the drum while movement of the piston rod inwardly of the casing releases the band. Springs 25 and 28 normally, in the absence of liquid in any of the chambers, hold the rod in its innermost position in which the central extension on piston 15 contacts the bottom wall of the casing.

The operation of this servo mechanism and the valves 36 and 46 associated therewith will be understood better from the following detailed description thereof. The line 47 is connected to a supply of liquid under substantially constant, or pump pressure, and this line 47 serves to introduce such liquid to the chamber 11 beneath piston 15 via valve 47 and also to deliver liquid to the valve 36, to be available whenever operating conditions require the use thereof. The valve member 50 in valve body 46 normally is in downmost position and is moved upwardly only when oil, under a variable pressure determined by the speed of rotation of the output shaft of the transmission, is supplied thereto through the line 41 and the branch 51. The regulation of pressure in line 41, in accordance with speed of rotation of the output shaft of the transmission, is well known since tail shaft governors are employed in many types of automatic transmissions. The line 42 leading to valve 36 is connected to a supply of fluid under pressure which varies in accordance with movement of the throttle lever controlling operation of the engine from which power is being transmitted. This type of variable liquid pressure is known to the art as compensator pressure and may range from zero to full pump pressure at wide throttle opening. The line 31 is connected to a supply of liquid under substantially constant pressure, i. e., pump pressure, which becomes available during certain operating conditions to cause release of the band.

Let it be assumed that the transmission is to be operated in first speed ratio. At the initiation of operation in this ratio, the valve 50 is in its downmost position; the valve 37 is spring-pressed to its downmost position and the piston rod 16, with pistons attached thereto, is also in its downmost position. As soon as selection of first speed ratio has been made, liquid under substantially constant pressure such as pump pressure is immediately supplied through line 47, ports in valve 46 and line 45 to the chamber 11 below piston 15, as the result of which this piston is forced upwardly in the casing, moving the piston rod 16 outwardly to apply the band to the drum to lock the same against rotation. Liquid in the branch line 44 is arrested by the land 38 of valve 37 while the liquid under variable or compensator pressure supplied by line 42 may pass from the valve through the line 35 to the chamber 12. Thus, as the speed of rotation of the transmission is increased, liquid under increasing pressure, or compensator pressure, is supplied to the chamber 12 and, hence, to piston 19 to add to the force exerted by piston 15 to maintain the band in applied condition. Compensator pressure, therefore, is utilized to augment pressure behind piston 15 during a predetermined range of output shaft speed of rotation which corresponds to a low range of vehicle speed. This low range encompasses first speed operation, but may also include third speed operation if the vehicle is accelerated at a low throttle opening.

When the speed of the output shaft and, consequently, of the vehicle exceeds the limits of the low range, the variable pressure exerted in the fluid supplied by line 41, or governor pressure, will increase to such an extent that this liquid, acting on the bottom of valve 37, will move it upwardly against spring 40 until the port connected to line 42 is closed, and the port connected to line 44 is opened, permitting the available liquid in line 44 to be introduced through line 35 to chamber 12. As before stated, the liquid in branch 44 is at a substantially constant or pump pressure, which is the maximum pressure required for aid in holding the band applied about the drum. Thus it will be seen that at speeds of operation above the predetermined range sufficient pressure is supplied to assure proper functioning of the first planetary unit in reduction drive and, under ordinary operation of the transmission, this higher range of speed occurs when the entire transmission is in third speed ratio.

The before described arrangement whereby liquid under constant pressure is utilized for applying the band is particularly advantageous during the operation of the transmission in Driving Range 3 when the transmission is in third speed. Since third speed is the normal top speed in this range, it follows that when the vehicle is permitted to decelerate with closed throttle so that the engine acts as a brake, considerable force must be exerted to retain the band applied during the braking action. When the engine is driving the mechanism through the first planetary unit, a force is exerted on the braked element tending to turn it in one direction. The band used for braking this element customarily is of the self-energizing type and, hence, a certain force is required to keep it applied. However, when the engine acts as a load, with the former driven element now acting to drive instead of being driven, the force exerted on the braked element tends to turn it in the opposite direction. Consequently, sufficient liquid pressure must be applied through the servo to overcome this overrun condition, thereby to keep the braked element stationary. The arrangement including the valve 36 and the supply line 44 serves admirably for this purpose.

In the shift of the mechanism from first to second in Driving Range 3, and both from first to second and third to fourth in Driving Range 4 the following takes place. It is necessary to engage the clutch between elements of the first unit and simultaneously release the band applied by the rod 16. Consequently, liquid under pressure is supplied simultaneously to the clutch to engage it, and through line 31 to the branch 30, and through passages 32 and 34 to pistons 22 and 15, respectively. Also this liquid is supplied to the top of land 38 of valve 37 to aid the spring 40 in moving the valve 37 downwardly against liquid under governor pressure. Such movement assures that the only liquid introduced into the chamber 12 will be that supplied by the line 42, i. e., liquid under compensator regulation.

The liquid acting on pistons 22 and 15 operates on surfaces large enough to assure that these pistons will be moved downwardly to the full permissible extent, carrying the rod along with the pistons to release the band. The piston surfaces so affected have a total area greater than the surfaces against which liquid is applied to oppose spring action. Since in the operation of the mechanism liquid is not completely exhausted from the lower part of chamber 11 and from chamber 12 while the rod 16 is retracted but is retained available for immediate use, the overall opposing areas for retracting the rod are provided. The action of valve 37 in this phase of operation assures that the only pressure applied to piston 19 to oppose the springs in the servo is the variable compensator pressure which ordinarily is less than full pump pressure and, therefore, the release pressure has less work to accomplish.

The valve 46 and the bypass 52 with restriction 54 performs a particular function when the mechanism is operating in Driving Range 4 and in fourth speed. In some occasions it is desirable to shift the mechanism from fourth speed to third speed by a full throttle opening. When such occurs the clutch in the front unit must be released, entailing exhausting the liquid from the clutch piston, and the front band must be applied with the two actions in timed relation. With the mechanism in fourth speed, as just mentioned, the pressure of liquid under governor regulation in line 41 and the branch 51 is sufficient to move the valve 50 upwardly, closing the ports connected to lines 47 and 45. Therefore, when the liquid supplied to release the band through line 31 and branch 30 is exhausted along with liquid to the front clutch, full pressure to apply the band by action on piston 15 can take place only by the liquid from supply line 47 passing through bypass 52 and restriction 54 to the line 45. The restriction 54 insures that full pressure in the lower part of chamber 11 can be developed only after a predetermined interval which can be so determined as to occur exactly as the front clutch is released. In this manner smooth shifting is accomplished.

When the mechanism is operated in reverse gear the front band must be applied and, at this time, there will be substantially no liquid under governor regulation and, consequently, the band will be applied by the presence of liquid under pressure in the lower part of chamber 11 introduced from the supply line 47 via valve 46 and line 45; and the only pressure occurring in chamber 12 will be that of liquid under compensator pressure, as described earlier.

From the foregoing it will be seen that the present invention provides servo mechanism and associated valving in which the piston rod of the servo is spring biased in one direction and has constant pressure available to oppose the springs to move the rod in the other direction, plus selectively either full pressure or variable pressure to aid in opposing spring action. This arrangement assures the force necessary for the efficient and smooth action so desirable in the devices of this character. It is to be understood that changes may be made without departing from the scope of the invention which is defined in the following claims.

What is claimed is:

1. In a hydraulically operated automatic transmission a servo device comprising a casing having a plurality of chambers therein, individual pistons reciprocable in said chambers, a piston rod secured to said pistons and having a part thereof extending from said casing, spring means for biasing said rod and pistons inwardly relative to the casing, a liquid supply line to one of said pistons for moving it to oppose said spring means, a supply line to another of said pistons, and valve means for selectively connecting said last mentioned supply line to a supply of liquid under substantially constant pressure and a supply of liquid under variable pressure for moving said piston to oppose said spring means.

2. In a hydraulically operated automatic transmission a servo device comprising a casing having a plurality of chambers therein, individual pistons reciprocable in said chambers, a piston rod secured to said pistons and having a part thereof extending from said casing, spring means for biasing said rod and pistons inwardly relative to the casing, a liquid supply line to one of said pistons for moving it to oppose said spring means, a supply line to another of said pistons, and selector means for selectively connecting said last mentioned supply line to a supply of liquid under substantially constant pressure and a supply of liquid under variable pressure for moving said piston to oppose said spring means, said selector means being operable to make connection selections in response to the pressure of liquid from a further supply of liquid under variable pressure.

3. In a hydraulically operated automatic transmission, a servo device comprising a casing having a plurality of chambers therein, individual pistons reciprocable in said chambers, a piston rod secured to said pistons and having a part thereof extending from said casing, spring means for biasing said rod and pistons inwardly relative to the casing, a liquid supply line to one of said pistons for moving it to oppose said spring means, a supply line to another of said pistons, and selector means for selectively connecting said last mentioned first supply line to a supply of liquid under substantially constant pressure and a supply of liquid under variable pressure for moving said piston to oppose said spring means, said selector means being operated by the pressure of liquid from a second supply of liquid under variable pressure, said selector means being biased to change selection at a predetermined pressure of liquid from said second supply of liquid under variable pressure.

4. In a hydraulically operated automatic transmission, a servo device comprising a casing having a plurality of chambers therein, individual pistons reciprocable in said chambers, a piston rod secured to said pistons and having a part thereof extending from said casing, spring means for biasing said rod and pistons inwardly relative to the casing, a liquid supply line to one of said pistons for moving it to oppose said spring means, and a supply line to another of said pistons, and selector means responsive to liquid under varying pressure and operable when said varying pressure is in a relatively high range to connect said last mentioned supply line to a supply of liquid under substantially constant pressure and operable when said varying pressure is in a relatively lower range to connect said last mentioned supply line to another supply of liquid under variable pressure for moving said piston to oppose said spring means.

5. In a hydraulically operated automatic transmission, a servo device comprising a casing having a plurality of chambers therein, individual pistons reciprocable in said chambers, a piston rod secured to said pistons and having a part thereof extending from said casing, spring means for biasing said rod and pistons inwardly relative to the casing, a liquid supply line to one of said pistons for moving it to oppose said spring means, and a supply line to another of said pistons, and valve means responsive to liquid under varying pressure and operable when said varying pressures is in a relatively high range to connect said last mentioned supply line to a supply of liquid under substantially constant pressure and operable when said varying pressure is in a relatively lower range to connect said last mentioned supply line to another supply of liquid under variable pressure for moving said piston to oppose said spring means, means for supplying liquid to certain of said pistons for moving them to aid said spring means and for supplying liquid to said valve means to cause it to connect said last mentioned supply line to said another supply of liquid under variable pressure.

6. In a hydraulically operated automatic transmission, a servo device comprising a casing having a plurality of chambers therein, individual pistons reciprocable in said chambers, a piston rod secured to said pistons and having a part thereof extending from said casing, spring means for biasing said rod and pistons inwardly relative to the casing, means for supplying liquid to certain of said pistons for moving them to aid said spring means, a liquid supply line to one of said pistons for moving it to oppose said spring means, and a supply line to another of said pistons, and a valve spring-biased in one direction and acted upon by varying governor pressure liquid to move it in the other direction, said valve in one position determined by a relatively low range of governor pressure connecting said last mentioned supply line to a supply of liquid under variable pressure for moving said piston to oppose said spring means, said valve in another position determined by a higher range of governor pressure connecting said last mentioned supply line to a supply of liquid under substantially constant pressure for moving said piston to oppose said spring means.

7. In a hydraulically operated automatic transmission, a servo device comprising a casing having a plurality of chambers therein, individual pistons reciprocable in said chambers, a piston rod secured to said pistons and having a part thereof extending from said casing, spring means for biasing said rod and pistons inwardly relative to the casing, means for supplying liquid to certain of said pistons for moving them to aid said spring means, a liquid supply line to one of said pistons for moving it to oppose said spring means, and a supply line to another of said pistons, and a valve spring-biased in one direction and acted upon by varying governor pressure liquid to move it in the other direction, said valve in one position determined by a relatively low range of governor pressure connecting said last mentioned supply line to a supply of liquid under variable pressure for moving said piston to oppose said spring means, said valve in another position determined by a higher range of governor pressure connecting said last mentioned supply line to a supply of liquid under substantially constant pressure for moving said piston to oppose said spring means, means for supplying liquid to certain of said pistons for moving them to aid said spring means and for simultaneously supplying liquid to said valve to aid the biasing spring thereof to move said valve to the first mentioned of said two positions.

References Cited in the file of this patent

UNITED STATES PATENTS

| | | |
|---|---|---|
| 2,640,373 | Jandasek | June 2, 1953 |
| 2,645,135 | Frank | July 14, 1953 |